Dec. 18, 1962 L. S. BIELINSKI 3,068,591
THREE DIMENSIONAL GRAPH
Filed May 27, 1960 2 Sheets-Sheet 1
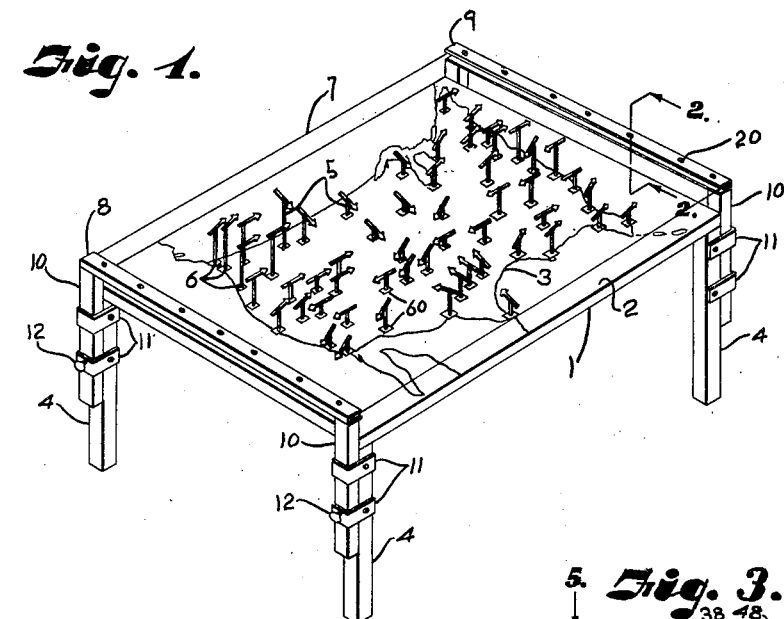
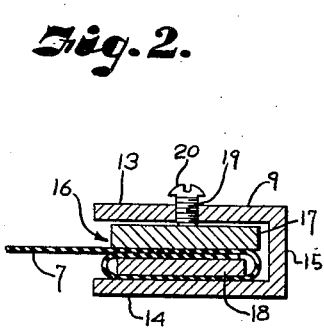
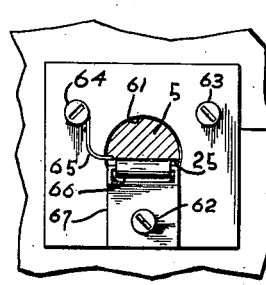
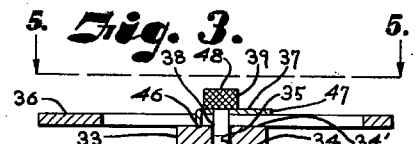
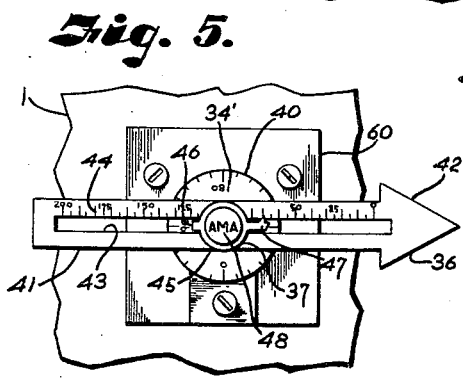
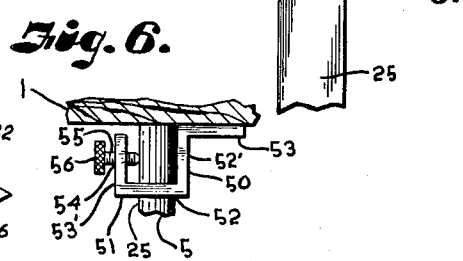
INVENTOR.
LEO S. BIELINSKI
BY
*Fishburn & Gold*
ATTORNEYS Dec. 18, 1962 L. S. BIELINSKI 3,068,591
THREE DIMENSIONAL GRAPH Filed May 27, 1960 2 Sheets-Sheet 2

INVENTOR.
LEO S. BIELINSKI

ATTORNEYS

United States Patent Office 3,068,591
Patented Dec. 18, 1962

3,068,591
THREE DIMENSIONAL GRAPH
Leo S. Bielinski, Kansas City, Mo.
(Box 121, Mingus, Tex.)
Filed May 27, 1960, Ser. No. 32,441
4 Claims. (Cl. 35—41)

This invention relates to a three dimensional graph adapted for visually displaying in their proper relationship and simultaneously, data concerning various localities on two dimensional indicia.

The principal objects of the present invention are: to provide a device for displaying a variable surface in three dimensions; to provide such a device in which a substantially transparent, stretchable sheet overlies a surface having indicia thereon, such as a map, and having a plurality of sheet supporting devices associated therewith, each representing a particular locality on said indicia and adjustable with respect to said surface; to provide such a device in which the stretchable sheet portions maintained between the supporting members indicate extrapolated data values between the supporting members; to provide such a device for representing a variable upper atmospheric constant pressure level or surface, including wind velocities and directions therein, in three dimensions as an aid to meteorologists in visualizing such surfaces; to provide such a device for presenting isentropic surfaces of the atmosphere in proper perspective and in proper relation to particular localities on the surface of the earth; and to provide such a device which is convenient to use and inexpensive to fabricate and maintain.

Other objects and advantages of this invention will become apparent from the following description taken in connection with the accompanying drawings wherein are set forth by way of illustration and example certain embodiments of this invention.

FIG. 1 is a perspective view of the three dimensional graph as a weather forecasting aid.

FIG. 2 is a sectional view taken on the line 2—2 of FIG. 1 showing a sheet retaining clamp.

FIG. 3 is a fragmentary sectional view in elevation showing a sheet supporting rod.

FIG. 4 is a fragmentary sectional view taken on the line 4—4 of FIG. 3.

FIG. 5 is a fragmentary view taken on the line 5—5 of FIG. 3.

FIG. 6 is a fragmentary view taken on the line 6—6 of FIG. 3.

Figure 7:
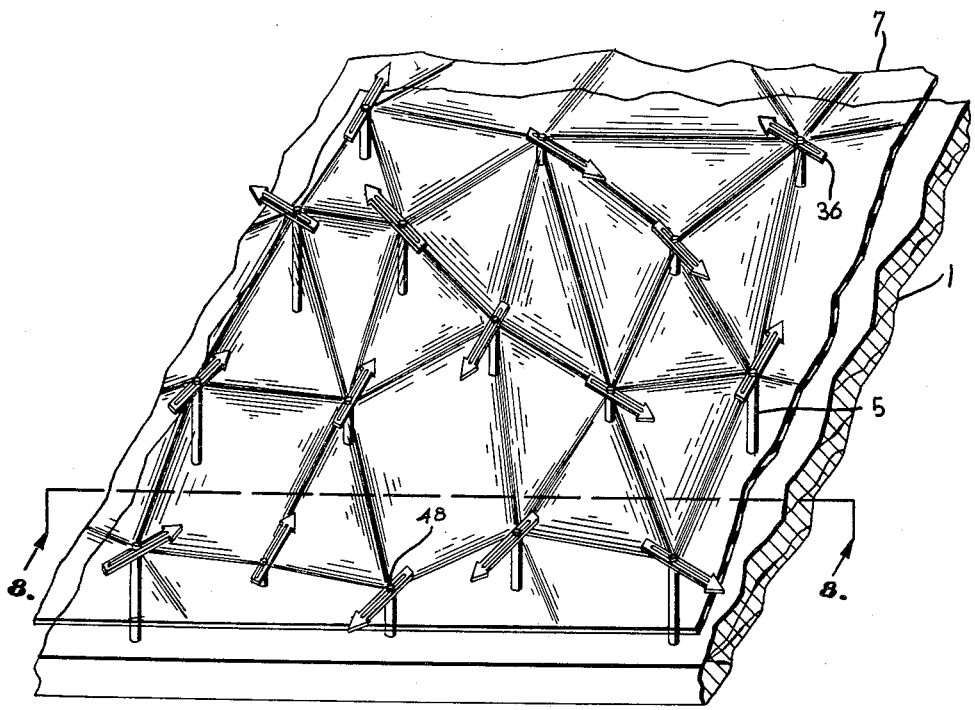
FIG. 7 is a perspective view of the three dimensional graph showing the stretching of the sheet.
Figure 8:
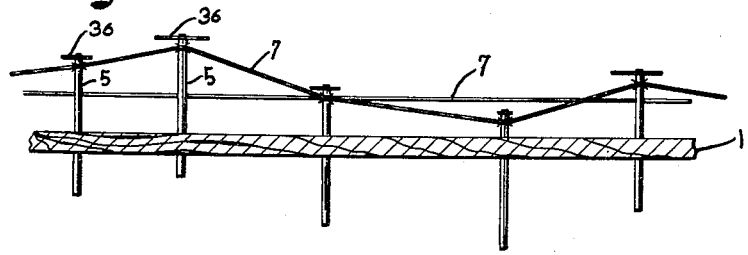
FIG. 8 is a sectional view taken on the line 8—8 of FIG. 7.

Referring more in detail to the drawings:

1 designates a table having an upper surface 2 with representative indicia 3 thereon. In the embodiment illustration the representative indicia 3 consists of a map of the United States which, if desirable, may be in relief. Legs 4 support the table 1 at a height convenient for observation of the surface 2. A plurality of vertical indicator rods 5 are inserted in receiving bores or holes 6 extending through the table 1. The receiving holes 6 are positioned, in the embodiment shown, to correspond with selected weather stations in the United States. A substantially transparent, stretchable rubber or plastic sheet 7 is mainained in map-overlying position between clamps 8 and 9 which are respectively located adjacent parallel side edges of the table 1. The sheet 7 is attached to each of the vertical indicator rods 5 for a purpose more fully explained hereinafter. The clamps 8 and 9 are supported at each end thereof by legs 10, which are vertically adjustable with respect to the table surface 2 in guides 11 which are secured to the table legs 4. Thumb screws 12 in selected guides 11 retain the legs 10 in adjusted vertical position.

The sheet 7 is securely retained in the clamps 8 and 9 as indicated in FIG. 2 wherein it is evident that the clamps are composed of a channel member having parallel flanges 13 and 14 and a web portion 15, defining a trough or depression 16 opening toward the table surface 2. The trough or depression 16 contains in opposed relation and parallel to the flanges 13 and 14 slats 17 and 18. The flange 13 has, in selected positions along the length thereof, threaded bores 19 containing set screws 20 which when rotated bear down upon the slats 17. The sheet 7 is anchored in the clamps 8 and 9 by being wrapped around the slats 18 which are in turn secured in the clamps 8 and 9 between the slats 17 and the inner surfaces of the flanges 14.

The vertical indicator rods 5 are preferably of aluminum and are half-round in shape with an elongated flat surface 25 thereon marked with a suitable vertically disposed scale 26 for a purpose explained hereinafter, FIG. 3. The upper end 27 of the indicator rods 5 is convex and contains a longitudinal threaded bore 28. A washer 29 having a concave face 30 and a convex face 31 is positioned on the convex upper end 27 of the indicator rods 5 with the convex face 31 facing upwardly. A washer 32 identical to washer 29 is positioned with the convex face thereof downwardly opposed to the convex face 31 of the washer 29, and the sheet 7 is positioned therebetween. A spacing member 33 having a convex face 34 on one end and a flat face 34' on the opposite end and a longitudinal bore 35 therebetween is positioned with the convex face 34 downwardly against the concave face of the washer 32. The spacing member 33 supports, on the flat face 34', a wind arrow 36 and a direction indicator 37 for a purpose explained in more detail hereinafter.

A screw 38 having a knurled head 39 passes through the direction indicator 37, wind arrow 36, spacing member 33, sheet 7, washer 29 and into the threaded bore 28 of the vertical indicator rods 5, maintaining the components in stacked, vertical relation, with the sheet 7 securely clamped between the convex faces of the washers 29 and 32, FIG. 3. The spacing member 33 carries on the flat face 34' a scale 40 which is graduated into degrees of a circle, FIG. 5. The wind arrow 36 which rests on the pedestal or flat face 34' of the spacing member 33 comprises an elongated portion 41 and an arrowhead portion 42. The elongated portion 41 contains an elongated slot 43 extending parallel to the portion 41 and through which the screw 38 extends. The elongated portion 41 has engraved thereon a scale 44 parallel thereto and having suitable graduations representing wind velocity.

The direction indicator 37 comprises a washer section 45 through which the screw 38 extends, a tail section 46 which is bent downwardly to engage the slot 43, and a pointer section 47 having a forked end with the prongs thereof respectively indicating positions on the scales 40 and 44, FIG. 5. The knurled head 39, on the upper end thereof, carries a notation 48 which identifies the particular weather station to which the respective rods 5 refer.

A plurality of retaining brackets 50 are secured to the under surface of the table 1 in alignment with the receiving holes 6. The retaining brackets 50 are comprised of a U-shaped or channel member 51 having an indicator rod receiving opening 52 in the web thereof. One leg 52' of the U-shaped member 51 has a lateral flange 53 for securing the bracket 50 to the underneath side of the table 1. The other leg 53' of the U-shaped member 51 has a threaded bore 54 for receiving the shank 55 of a set screw 56 with its inner end extending toward the leg 52' of the U-shaped member and in position to urge the vertical indicator rods 5 against the inside of the leg 52', providing for selective vertical positioning and retention of the indicator rods 5 with respect to the table 1.

Bushing plates 60 having bores 61 therein are secured by means of screws 62, 63 and 64 to the upper surface 2 of the table 1 with the bores 61 in alignment with the receiving holes 6 to provide a bearing surface for the indicator rods. Pointer wires 65 are maintained by the screws 64 in indicating position with respect to the scales 26 on the indicator rods 5.

Rollers 66 are maintained in position to rotate about a horizontal axis and in rolling position against the flat surfaces 25 of the indicator rods 5 by means of flat springs 67 secured to the bushing plates 60 by screws 62. The rollers 66 urge the indicator rods 5 against the edge of the bores 61 in the bushing plates 60 to prevent unwanted play or looseness of the indicator rods 5 when a screw 56 is disengaged therefrom.

The invention may assume other forms for representing data in three dimensions, but in the form illustrated the invention is adapted to display an upper atmospheric constant pressure level or surface such as a 500 millibar pressure level as an aid to meteorologists in visualizing such a surface in the proper perspective. In conventional practice, such surfaces are represented in two dimensions on multiple sheets of paper and the meteorologists being forced to reason in three dimensions often form an erroneous impression as to actual conditions. In using this invention, teletype reports from each weather station are collected. These contain data regarding the height of the 500 millibar level above each weather station, and the indicator rods 5 referring to the respective stations are adjusted in height, illustrating comparative values and also forming an absolute representation of said level at various localities as indicated by the scales 26 in relation to the pointer wires 65. These reports also contain data as to the wind direction and velocity of the 500 millibar level above the respective stations, which data is displayed by adjusting the wind arrows 36 both circularly about the axis of the indicator rod 5 to indicate wind direction, and by displacing the arrowhead portion 42 from the axis of the indicator rods 5 a distance sufficient to represent the wind velocity on the scale 44, the wind direction being simultaneously indicated by the scale 40.

The sheet 7 will be contoured between the respective indicator rods 5 indicating extrapolated data values between the rods 5 and portraying "highs," "lows," "ridges," "troughs" and other features of the 500 millibar level not readily sensible from the conventional two dimensional charts. The wind arrows 36, when viewed in a group, clearly indicate the prevailing wind patterns. The clamps 8 and 9 are adjusted to a convenient height to prevent undue stretching of the sheet 7.

It is evident that this invention can also be utilized for representing other commonly investigated pressure levels such as 150 millibar or 850 millibar or data such as isentropic surfaces, jet streams, specified temperature levels and so forth, saving plotting and analyzing time and clearly portraying the overall relationships necessary to accurately predict weather conditions. Changes with time can be visualized by the use of two or more such devices having the settings thereon separated by a particular time interval.

It is to be understood that while I have illustrated and described one form of my invention it is not to be limited to this specific form or arrangement of parts herein described and shown except insofar as such limitations are included in the claims.

What I claim and desire to secure by Letters Patent is:
1. A three dimensional graph comprising, a surface having a map thereon, a plurality of spaced supporting means, each of said supporting means having a portion thereof related to a locality on said map and adjustable to selected elevated positions with respect to said locality, means for retaining said portions in said selected elevated positions, means for indicating the degree of elevation of said portions, a substantially transparent stretchable sheet overlying said map and spaced therefrom, and means securing said sheet in spread condition to said portions, whereby data related to said respective localities and depictable by the degree of elevation of said portions are simultaneously displayed, indicating absolute data values and comparative data values between said localities, said sheet indicating extrapolated data values between said localities.

2. The apparatus of claim 1 including means associated with said portions for depicting wind direction and velocity with respect to said localities.

3. A weather forecasting aid comprising, a horizontal surface having a map thereon, a plurality of vertical, spaced supporting rods, each of said supporting rods being positioned at a locality on said map referring to a weather data collecting station, means for adjusting said rods to selected elevated positions with respect to said locality, means for retaining said rods in said selected elevated positions, means for indicating the degree of elevation of said rods, a substantially transparent stretchable sheet overlying said map and spaced therefrom, and means for securing said sheet in spread condition to the upper ends of said rods, whereby data collected by said weather stations and related to said respective localities and depictable by the degree of elevation of said rods are simultaneously displayed, indicating absolute data values and comparative data values between said localities, said sheet indicating extrapolated data values between said localities.

4. A device for representing variable atmospheric surfaces in three dimensions comprising, a table having an upper surface, a map on said surface, a plurality of vertical receiving bores in said table corresponding to weather stations on said map, elongated indicator rods in said bores and each having a portion of the outside surface thereof marked with a vertically disposed scale, brackets secured to said table for maintaining said indicator rods in selected vertical positions with respect to said surface, means indicating the vertical positions of said rods by reference to said scales, the upper end of each of said rods having a pair of washers retained thereon, a substantially transparent stretchable sheet overlying said map and spaced therefrom, said sheet being retained between said pairs of washers on said respective ends, each rod having positioned above said washers a spacing member, a wind arrow secured to the upper surface of each of said spacing members, said wind arrow directionally adjustable in a horizontal plane and offsetable with respect to said indicator rods, whereby data regarding said variable atmospheric surface and related to said respective localities and depictable by the degree of elevation of said indicator rods are simultaneously displayed and wind directions and velocity at said localities are simultaneously displayed by the direction and degree of offset with said wind arrows.

References Cited in the file of this patent

UNITED STATES PATENTS

| | | |
|---|---|---|
| 373,100 | Smith | Nov. 15, 1887 |
| 1,683,952 | Cadman | Sept. 11, 1928 |
| 2,185,689 | Jensen | Jan. 2, 1940 |
| 2,560,618 | Wenberg | July 17, 1951 |

FOREIGN PATENTS

| | | |
|---|---|---|
| 30,180 | Germany | Jan. 10, 1885 |